US011935461B2

(12) United States Patent
Bonne et al.

(10) Patent No.: US 11,935,461 B2
(45) Date of Patent: Mar. 19, 2024

(54) LED DRIVER VOLTAGE ACCOUNTING FOR TEMPERATURE ESTIMATE

(71) Applicant: Lumileds LLC, San Jose, CA (US)

(72) Inventors: Ronald Johannes Bonne, Plainfield, IL (US); Claire Yue Gao, Fremont, CA (US); David Christopher Jansson, Mountain View, CA (US); Zhi Hua Song, Palo Alto, CA (US)

(73) Assignee: Lumileds LLC, San Jose, CA (US)

( * ) Notice: Subject to any disclaimer, the term of this patent is extended or adjusted under 35 U.S.C. 154(b) by 0 days.

(21) Appl. No.: 17/992,158

(22) Filed: Nov. 22, 2022

(65) Prior Publication Data

US 2023/0186835 A1 Jun. 15, 2023

Related U.S. Application Data

(60) Provisional application No. 63/289,682, filed on Dec. 15, 2021.

(51) Int. Cl.
*G09G 3/32* (2016.01)

(52) U.S. Cl.
CPC ....... *G09G 3/32* (2013.01); *G09G 2320/0233* (2013.01); *G09G 2320/0626* (2013.01); *G09G 2320/0666* (2013.01); *G09G 2340/16* (2013.01)

(58) Field of Classification Search
CPC ............. G09G 3/32; G09G 2320/0626; G09G 2320/0233; G09G 2320/0242; G09G 2340/16; G09G 2320/0666; G09G 2320/041; G09G 2320/0295
See application file for complete search history.

(56) References Cited

U.S. PATENT DOCUMENTS

| | | | | |
|---|---|---|---|---|
| 11,191,141 | B1 | 11/2021 | Lopez et al. | |
| 2007/0001940 | A1* | 1/2007 | Jo | G09G 3/2014 345/77 |
| 2009/0213049 | A1* | 8/2009 | McCreary | G09G 3/3233 345/80 |
| 2016/0353532 | A1* | 12/2016 | Caldwell | H05B 45/14 |
| 2020/0312231 | A1 | 10/2020 | Hussell | |
| 2021/0251066 | A1 | 8/2021 | Bonne et al. | |
| 2022/0101781 | A1 | 3/2022 | Baumheinrich et al. | |

FOREIGN PATENT DOCUMENTS

| | | |
|---|---|---|
| KR | 2021-0118931 A | 10/2021 |
| WO | WO-2021/108735 A1 | 6/2021 |

OTHER PUBLICATIONS

"International Application Serial No. PCT/US2022/050727, International Search Report dated Mar. 30, 2023", 6 pgs.
"International Application Serial No. PCT/US2022/050727, Written Opinion dated Mar. 30, 2023", 5 pgs.

* cited by examiner

*Primary Examiner* — Muhammad N Edun
(74) *Attorney, Agent, or Firm* — Schwegman, Lundberg & Woessner, P.A.

(57) ABSTRACT

A method for control of a pixel array based on a temperature estimate is provided. A method includes sampling an anode voltage of each LED of a plurality of pixels resulting in sampled voltages, determining an average voltage based on the sample voltages, and determining a total voltage to provide to the pixels based on the average voltage and voltage data from a memory coupled to the controller, the voltage data including one or more of a 3-sigma value, a driver headroom value, a resistance value, or a k-factor value.

20 Claims, 7 Drawing Sheets

LED DRIVER VOLTAGE ACCOUNTING FOR TEMPERATURE ESTIMATE

CLAIM OF PRIORITY

This application claims the benefit of U.S. Provisional Application No. 63/289,682, filed on Dec. 15, 2021, which is hereby incorporated by reference in its entirety.

TECHNICAL FIELD

The present disclosure relates generally to light emitting diode (LED) junction level temperature estimating and a corresponding voltage level setting in a monolithic or segmented LED die.

BACKGROUND

Use of micro-LED displays or projectors is an emerging technology in the lighting and display industry. A micro-LED array can contain arrays of thousands to millions of microscopic LED pixels that actively emit light. Micro-LEDs of the array can be individually controlled. As compared to other display technologies, micro-LED arrays can have a higher brightness and better energy efficiency, making them attractive for a variety of applications, such as television display or backlight, automotive lighting, or mobile phone lighting.

DETAILED DESCRIPTION

Figure 1:
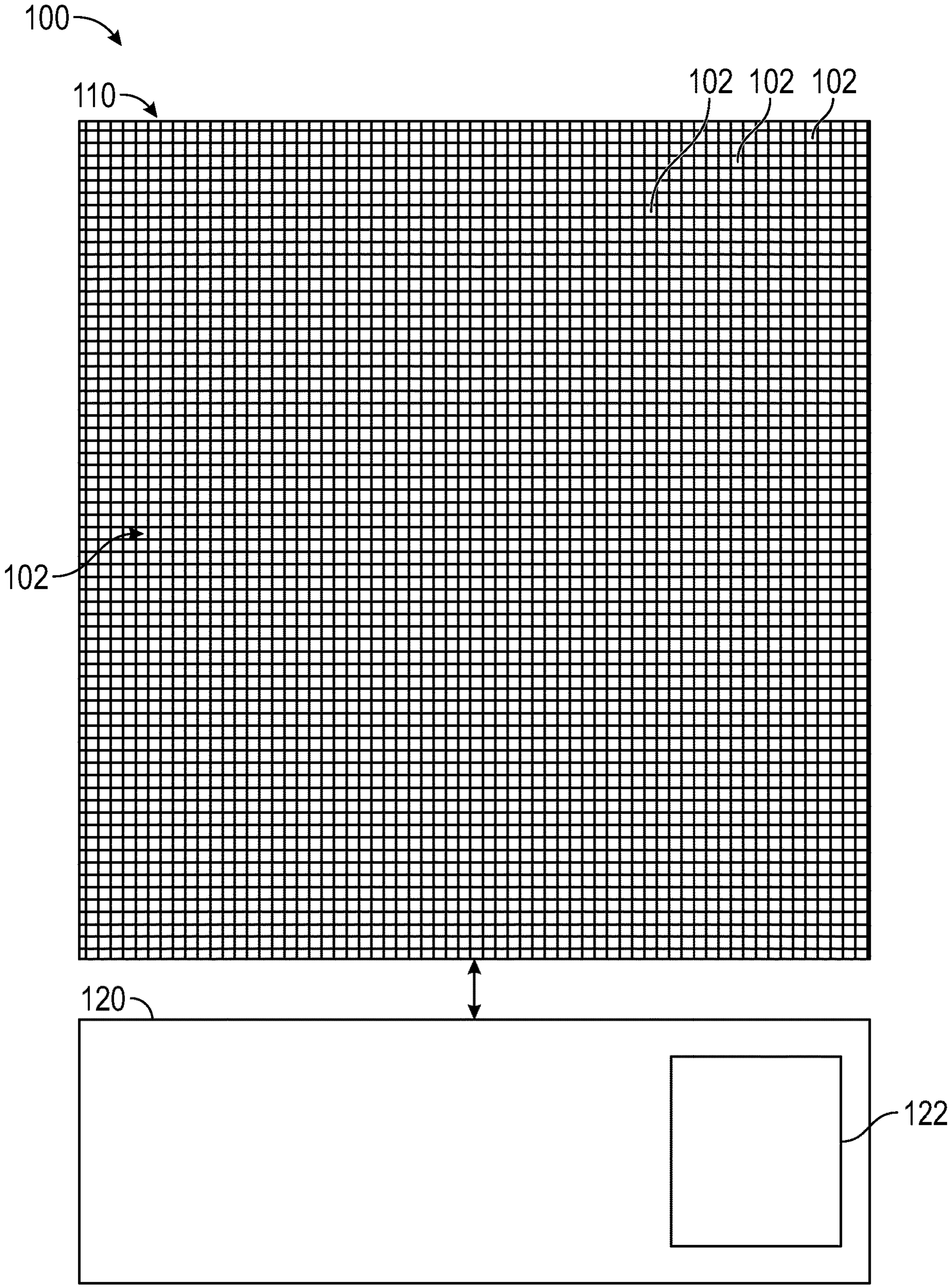
FIG. 1 illustrates an LED display system that includes an LED array that supports individual pixel temperature measurements.

Unfortunately, emitted light color or intensity in a micro-LED array is a function of LED temperature. Varying temperature across a die or substrate supporting micro-LEDs can result in unacceptable micro-LED color or intensity changes. When the display is uniform, these changes can be seen in a display as color or light intensity banding, bright spots, or dark spots. For smaller LED pixel arrays, controlling the intensity change due to temperature variation can be accomplished using feedback sensors. However, such control systems are generally not available for larger micro-LED matrix pixel arrays that already face additions operational power and data management problems that are not experienced by the smaller LED pixel arrays. Individual light intensity of thousands or millions of emitting pixels can be monitored and adjusted to compensate for temperature if the techniques for smaller micro-LED array are on larger micro-LED arrays. Such a task is not practical at higher display refresh rates because of the number of pixels.

LED temperature is only one of a variety of parameters to consider in determining a current level, $I_{LED}$, (and associated voltage level ($V_{LED}$)) at which to drive a given LED. Other factors that affect that can be considered in determining the current level at which to drive the LED include the duty cycle, driver headroom ($V_{LDO}$), the distribution of forward voltages, $V_f$, of microLEDs in the array, a voltage drop due to circuitry losses in a metal plane, traces, or other interconnects or electric components, whether the LED is making a change from dark to bright, or vice versa, or a combination thereof.

The duty cycle determines average pixel current which in turn determines the temperature of the LED, and thus affects the forward voltage and ultimately, the operation of the LED. As the duty cycle increases, the temperature of the LED increases and the corresponding forward voltage of the LED decreases. As the duty cycle decreases, the temperature of the LED decreases and the corresponding forward voltage of the LED increases.

Driver headroom is the voltage drop across a pixel driver of a corresponding pixel. Driver headroom in the context of a driver of an LED of a microLED array is about 190 millivolts in some specific implementations and different in different driver implementations. The driver headroom is widely variable among driver designs. Different driver configurations and different silicon fabrications of the driver alter the driver headroom.

The voltage drop across metal planes, traces, or other interconnects manifests as temperature increases in the LED (or other components). This voltage drop provides an increase in temperature and thus a drop in the forward voltage of the LED.

A K factor is a constant that indicates how much to change $V_{LED}$ if there is an anticipated change in content to be provided by the LED. The change in content can be brightness, color, or the like.

The duty cycle indicates how much time the LED is operated relative to a total available time. For example, a 50% duty cycle means that the LED produces light 50% of the time.

FIG. 1 illustrates an LED display system 100 that includes an LED array 110. As illustrated, each box in array 110 defines a pixel 102 that can have temperature individually estimated using a system controller 120 that supports a temperature monitor and control system 122. The temperature monitor and control system 122 for the LED array 110 can include circuit-based drivers that allow measurement of bus voltage (sometimes called anode voltage). The measurement of bus voltage can be used to determine LED forward voltage, which can be mapped to a corresponding temperature for the pixel. Using the system controller 120, adjustments to the LED array 110 based on the detected temperature can be made. Adjustments can include varying pixel intensity, color, and on/off state for individual pixels 102 or selected groups of pixels, such as by adjusting a pulse width modulation (PWM) duty cycle of one or more colors.

In some embodiments, the LED array 110 can be formed from an array or arrays of microLEDs (sometimes called "μLEDs" or "uLEDs"). MicroLEDs can support high density pixels having a lateral dimension less than 100 micrometers (μm) by 100 μm. In some embodiments, microLEDs with dimensions of about 50 μm in diameter or width and smaller can be used. Such microLEDS can be used for the manufacture of color displays by aligning, in close proximity, microLEDs that emit at multiple visible wavelengths, for example, red, blue, and green wavelengths. In some embodiments, microLEDS can be defined on a monolithic gallium nitride (GaN) or other semiconductor substrate, formed on segmented, partially, or fully divided semiconductor substrate, or individually formed or panel assembled as groupings of microLEDs. In some embodiments, the LED array 110 can include small numbers of microLEDs positioned on substrates that have a centimeter scale area or greater. In some embodiments, the LED array 110 can support microLED pixel arrays with hundreds, thousands, or millions of LEDs positioned together on centimeter scale area substrates or smaller. In some embodiments, microLEDS can include LEDs sized between 30 microns and 500 microns. In some embodiments, the microLED pixel arrays can be formed from LEDs of various types, sizes, and layouts. In some embodiments, one-dimensional (1D) or two-dimensional (2D) matrix arrays of individually addressable LEDs can be used. Commonly, N×M arrays where N and M are respectively between two and one thousand can be used. Individual LED structures can have a square, rectangular, hexagonal, polygonal, circular, arcuate, or other surface shape. Arrays of the LED assemblies or structures can be arranged in geometrically straight rows and columns, staggered rows or columns, curving lines, or semi-random or random layouts. LED assemblies that can include multiple LEDs formed as individually addressable pixel arrays are also supported. In some embodiments, radial or other non-rectangular grid arrangements of conductive lines to the LED can be used. In other embodiments, curving, winding, serpentine, and/or other suitable non-linear arrangements of electrically conductive lines to the LEDs can be used.

Figure 2:
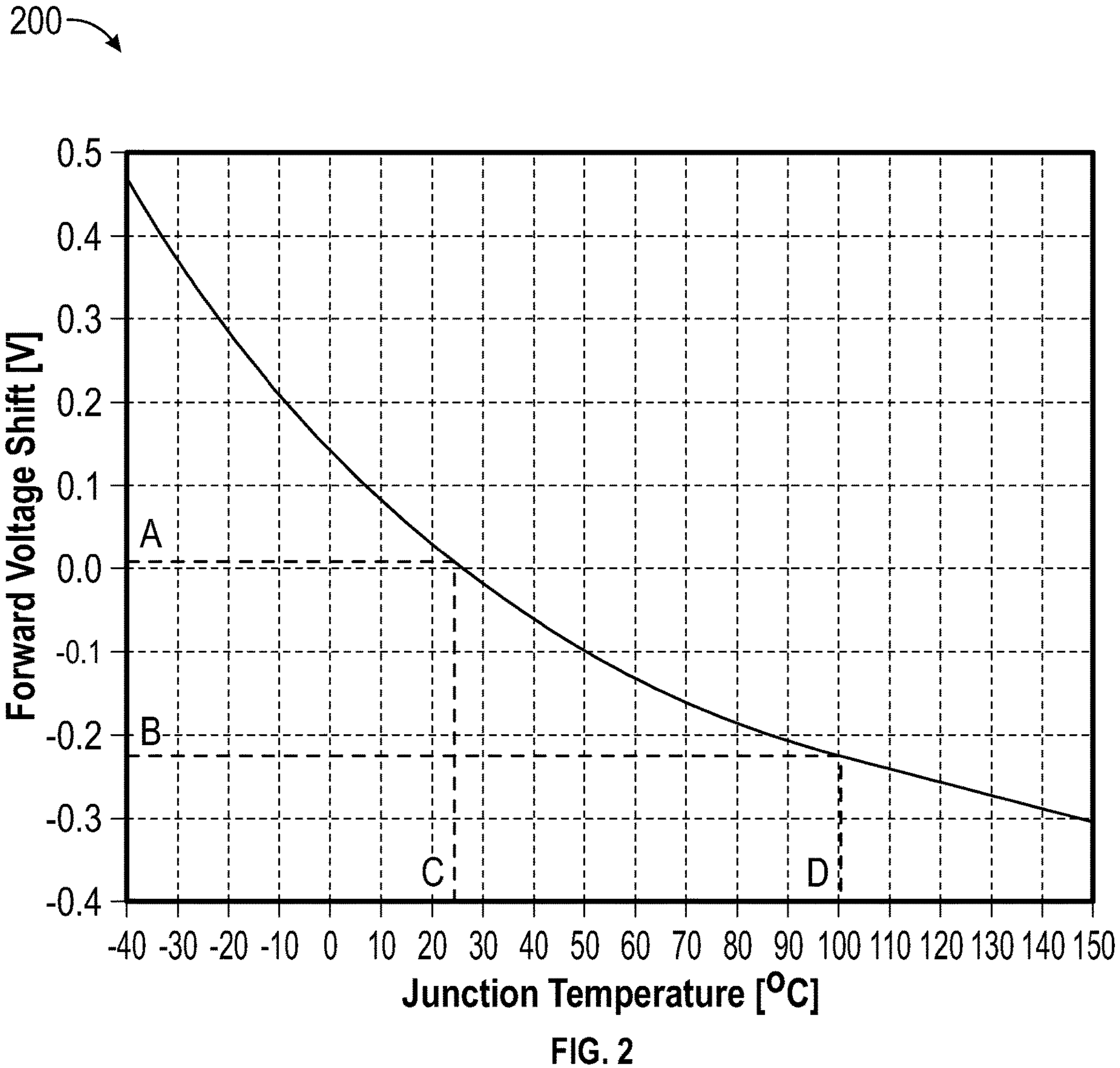
FIG. 2 is a representative graph of forward voltage shift versus junction temperature.

FIG. 2 is a representative graph 200 of forward voltage shift versus junction temperature that illustrates temperature determination using forward voltage shift measurement. As seen in graph 200, an LED formed with a PN junction can be provided with current that induces a forward voltage shift in the LED. Measurement of the associated forward voltage shift of the LED has a negative temperature coefficient of a few millivolts per degree Celsius, typically −2 mV/° C. FIG. 2 shows an example curve illustrating the shift of forward voltage as a function of LED junction temperature at a certain current value.

Figure 3:
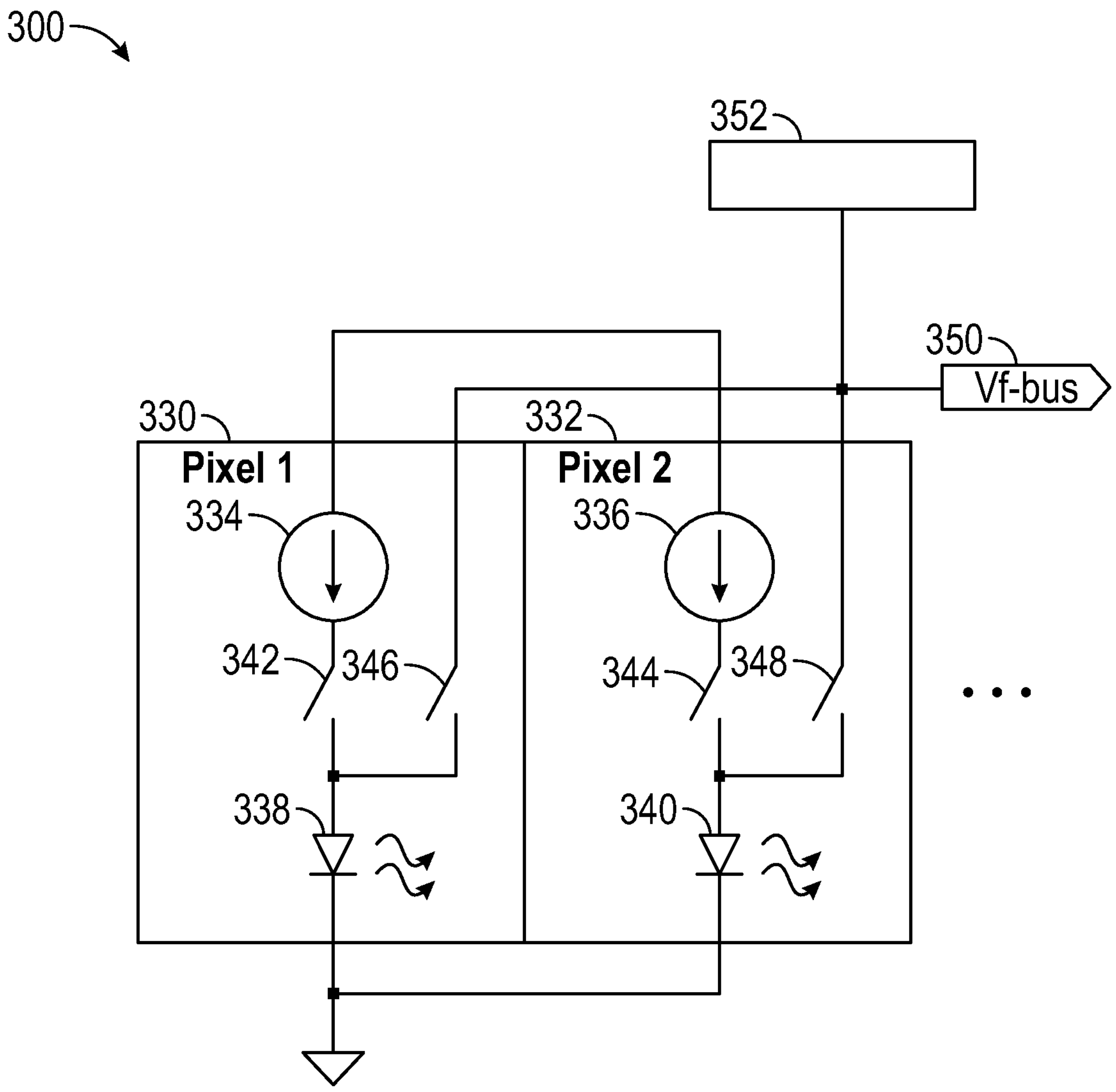
FIG. 3 illustrates an embodiment of a representative circuit driving two pixels that includes temperature measuring capability.

FIG. 3 illustrates an embodiment of pixel level circuitry 300 that permits measuring pixel temperatures. In this circuitry 300, two representative pixels 330, 332 can be from an microLED array that supports thousands to millions of pixels. Each pixel 330, 332 has a respective driver and a respective LED 338, 340. The illustrated circuit 300 includes a current source 334, 336 and a pulse width modulation (PWM) switch 342, 344, combined to form the driver, but alternative current and control systems that provide a current to drive the individual LED pixel can be used. Another switch 346 is connected to the anode of LED 338 of the pixel 330, and a switch 348 is similarly connected to the anode of LED 340 of the pixel 332. The other terminal of both switches 346, 348 are illustrated as being connected to a common power node bus 350.

During operation, a control block 352 can scan a microLED array by electrically turning on the switch 346, 348 connected to each LED 338, 340 one by one. For instance, when the control block 352 turns on the switch 346 and turns off the switch 348 and concurrently turns off all other switches connected to other pixels, the voltage on the bus 350 equals the LED forward voltage of the LED 338. The bus 350 of the LED 338 of the pixel 330 can be sent to the control block 352 for processing and/or storage in memory. When the switch 346, and all other switches of other pixels of the LED array, are turned off and only the switch 348 is turned on, the forward voltage of the LED 340 of the pixel 332 can be measured at the bus 350 and processed in the control block 352. In this way, the LED voltage, on the bus 350, of pixels in the matrix can be measured one at a time.

Figure 7:
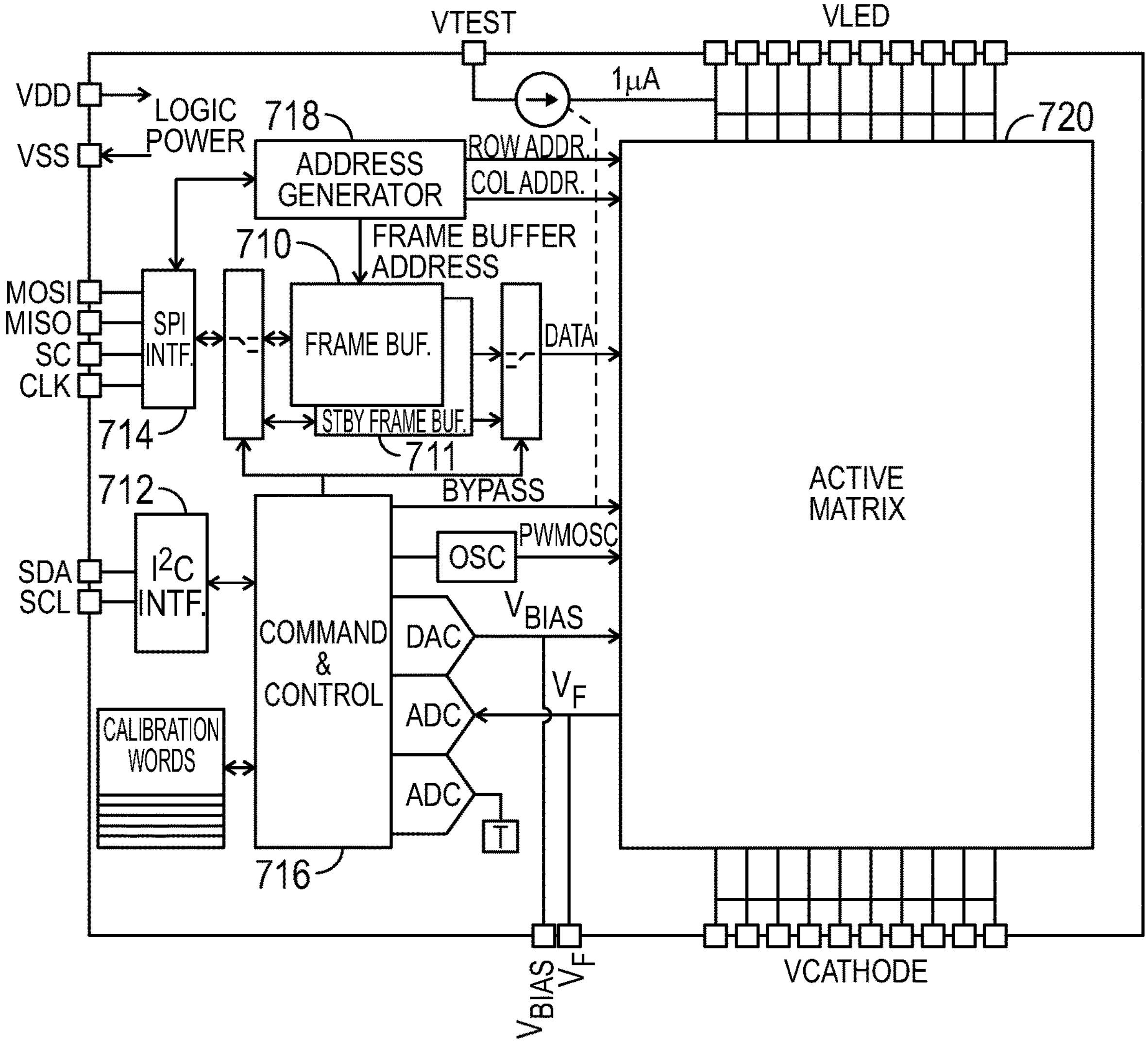
FIG. 7 illustrates a detailed chip level implementation of a system having a microLED control module.

The control block 352 can be controlled by a higher-level controller, such as the temperature monitor and control system 122 (see FIG. 1) or command and control module 716 (see FIG. 7). The command-and-control module 716 of FIG. 7 can include or implement the functionality of the temperature monitor and control system 122 or vice versa.

Figure 4:
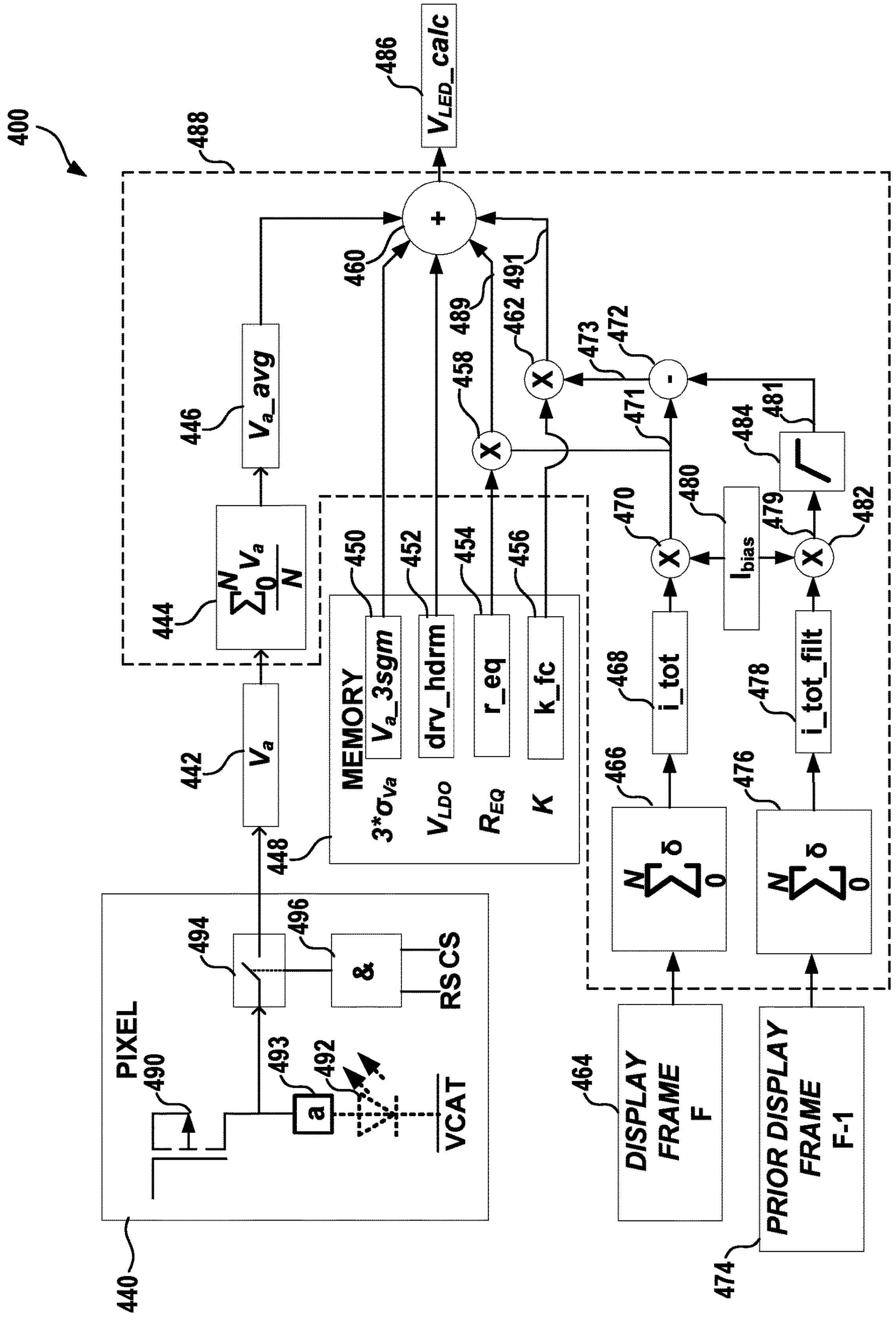
FIG. 4 illustrates an embodiment of a system for adjusting LED driver voltage that accounts for an average temperature estimate of the LED array.

FIG. 4 illustrates, by way of example, a block diagram of an embodiment of a system 400 for setting $V_{LED}$ to compensate for estimated temperature. The compensation can be independent of an actual measurement of the temperature, such as with a thermometer. The system 400 as illustrated includes a pixel 440, a memory 448, and a controller 488. The controller 488 can be similar to the control block 352 of FIG. 3. The pixel 440 can be similar to the pixel 330, 332. The pixel 440 includes a driver 490 and an LED 492 (e.g., a single LED) electrically coupled to the driver 490. The pixel 440 can provide a voltage 442 provided to the LED 492 responsive to a row select (RS) and a column select (CS) being asserted. A gate 496 (e.g., an AND gate in the example of FIG. 4) can be used to sense when the RS and the CS for the given pixel 440 have been asserted. A switch 494 can be closed responsive to the assertion of RS and CS.

At operation 444, the controller can maintain a running total of an average voltage 446 of the last N voltages 442 sampled (represented by operation 444). The average voltage 446 is the sum of the last N voltages sampled divided by N. N is the number of pixels 440 in the microLED array 110 (see FIG. 1). The voltage 442 can be stored in a memory, such as the memory 448 of a different memory. The average voltage 446 can be stored in a memory, such as the memory 448 or a different memory. The average voltage 446 is a moving average of the anode 493 voltage of all pixels 440. This value changes with temperature and globally set pixel current, Ibias (bias current 480). The number of voltage 442 samples used for the moving average can be configurable. For diagnostics purposes and to override unreliable average voltages 446, voltage 442 values falling outside an acceptable voltage user-defined window can be excluded from average voltage 446 computation. Sampling the anode 493 voltage 442 (closing of the switch 494) can occur intermittently, on a repeating schedule, during a predetermined time, or the like. This allows continuous, occasional or schedule adjustment of microLED pixel voltage, such as to compensate for temperature.

The memory 448 can include one-time programmable (OTP) values stored thereon. The OTP values illustrated in FIG. 4 include a 3-sigma value 450 for the voltages 442, a driver headroom value 452, a resistance value 454, and a k-factor value 456. The 3-sigma value 450 is 3 times a standard deviation of the forward voltages of the pixels 440. The standard deviation can be programmed at testing time of the microLED array 110.

The driver headroom value 452 indicates how much higher than $V_f$, the $V_{LED}$ needs to be for the driver 490 to operate the LED 492. 190 millivolts is a typical value for driver headroom. The driver headroom value 452 can be programmed at testing time of the microLED array 110.

The resistance value 454 is an estimate of the equivalent resistance used to determine I*R losses from the backplane. The I*R losses are converted to heat, which affects $V_f$. The losses are from metal planes, traces, or other structures that are not accounted for elsewhere. The estimated voltage drop due to IR losses is from IR losses in a backplane and surrounding package. The backplane and surrounding package are illustrated in FIG. 7 and includes the circuitry coupled to active matrix 720. The "R" value 454 can be programmed at testing time of the microLED array 110. The "I" value of the IR losses can be computed by multiplying the sum of PWM values (duty cycle values) of all pixels with the globally set bias current 480, Ibias.

The k-factor value 456 indicates how much to increase $V_{LED}$ if there is an anticipated change in content to be provided by the LED 492. For example, if display frame data 464 indicates that the LED 492 is bright (or dim) and the display frame data 474 indicates that the LED 492 is dim (or bright), the k-factor value 456 can be used to adjust VLED accordingly. The k-factor value 456 is a constant that indicates what $V_{LED}$ change is needed to accommodate the anticipated change in brightness or intensity.

Display frame data 464 for a current frame can be provided or retrieved, such as from a memory of display frame data. The display frame data 464 indicates a duty cycle, δ, for each pixel 440, 102 of the microLED array 110. The controller 488 can determine an estimate of input current 468 for the current frame as a total of the duty cycles of all pixels in the microLED array 110 (by operation 466). Similarly, the controller 488 can determine an estimate of input current 478 (by operation 476) for the immediately prior frame (based on the prior display frame data 474) as a total of the duty cycles of all pixels in the microLED array 110 in providing the prior frame. A frame is provided by operating the microLEDs 492 of pixels 102 of the microLED array 110 in accord with the duty cycles defined in the frame data 464, 474 for a specified amount of time.

A bias current 480 can be multiplied, by multiplier 470, by the estimate of the input current 468 resulting in a biased current estimate 471. The bias current 480 can be multiplied by the estimate of the input current 478 by multiplier 482 resulting in a biased prior current estimate 479. The biased prior current estimate 479 can be low-pass filtered by a low pass filter 484 resulting in a low pass filtered estimate 481 of the biased prior current estimate 479. The low pass filter 484 helps reduce extreme changes in intensity that can result in visible flashes in the display provided by the microLED array 110.

A current difference 473 between the low pass filtered current estimate 481 and the biased current estimate 471 can be determined by the controller 488 at subtractor 472. The current difference 473 can be multiplied, by multiplier 462, by the k-factor value 456 to provide a $V_{LED}$ adjustment 491 that accounts for the brightness or intensity difference between the immediately previous frame data 474 and the current frame data 464. The resistance value 454 can be multiplied, by multiplier 458, by the biased current estimate 471 to determine I*R losses 489.

The controller 488 can sum, by adder 460, the average voltage 446, the 3-sigma value 450, the driver headroom value 452, I*R losses 489, $V_{LED}$ adjustment 491, or a combination thereof, to determine a calculated $V_{LED}$ 486.

Figure 5:
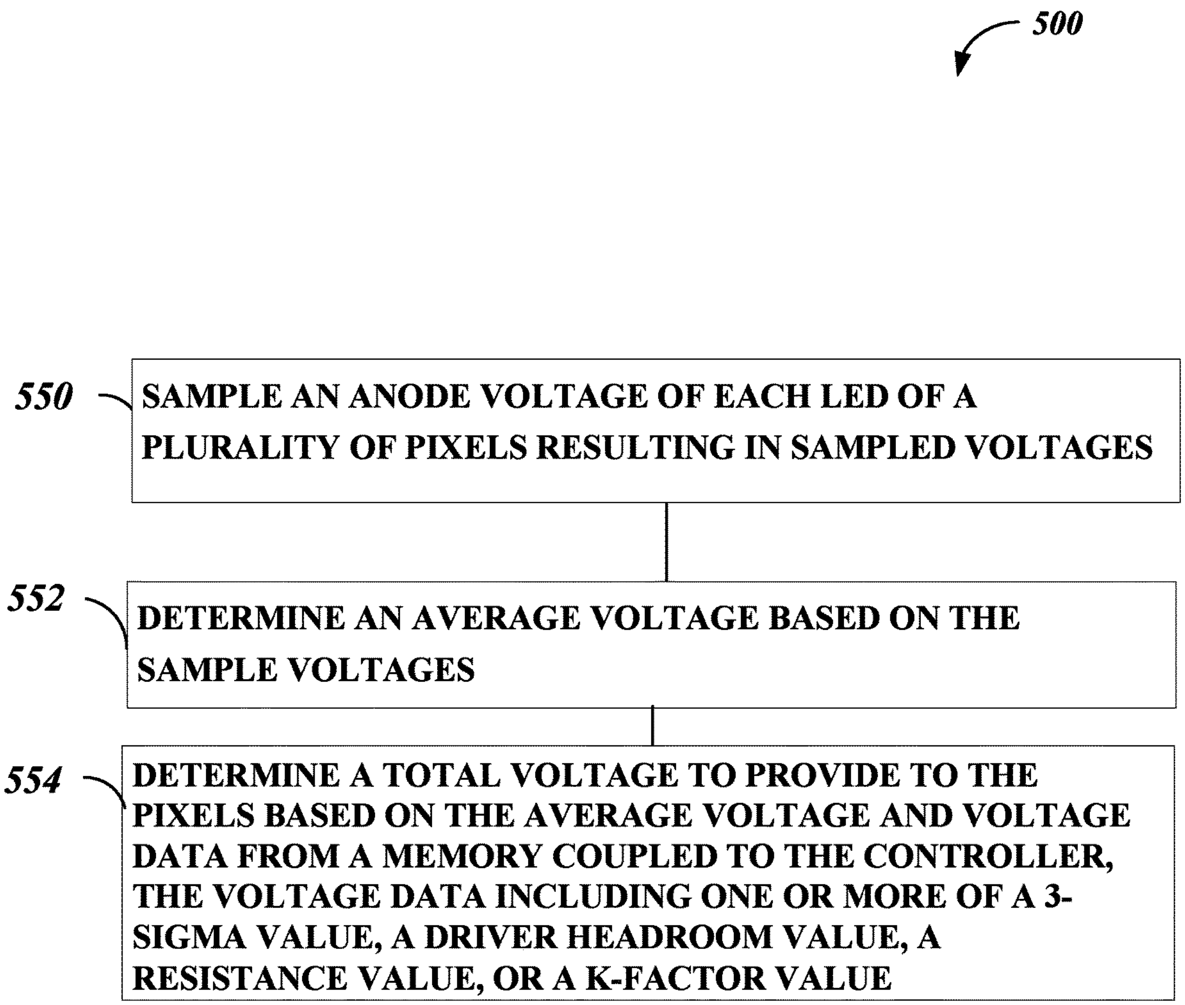
FIG. 5 illustrates an embodiment of a procedure for measuring pixel temperatures.

FIG. 5 illustrates one embodiment of a method 500 for estimating a voltage to provide to an LED driver that accounts for pixel temperatures. The method 500 as illustrated includes sampling an anode voltage of each LED of a plurality of pixels resulting in sampled voltages, at operation 550; determining an average voltage based on the sample voltages, at operation 552; and determining a total voltage to provide to the pixels based on the average voltage and voltage data from a memory coupled to the controller, the voltage data including one or more of a 3-sigma value, a driver headroom value, a resistance value, or a k-factor value, at operation 554.

The voltage data can further include data indicating respective duty cycles for each of the pixels for a current display frame and an immediately previous display frame. The method 500 can further include estimating a first total current for the current display frame as a sum of the duty cycles for the pixels for the current display frame. The method 500 can further include determining the total voltage based on the first total current.

The voltage data can include a global bias current. The method can further include multiplying the first total current by the global bias current resulting in a first biased current. The method 500 can further include multiplying the first biased current by the resistance value resulting in I*R losses. The method 500 can further include determining the total voltage further based on the I*R losses.

The method 500 can further include estimating a second total current for the immediately previous display frame as a sum of the duty cycles for the pixels for the immediately previous display frame. The method 500 can further include determining the total voltage based on the second total current. The method 500 can further include multiplying the second total current by the global bias current resulting in a second biased current. The method 500 can further include determining a biased current difference between the first biased current and the second biased current. The method 500 can further include determining the total voltage based on the biased current difference.

The method 500 can further include multiplying the second biased current by the k-factor value resulting in an LED voltage adjustment. The method 500 can further include determining the total voltage based on the LED voltage adjustment. The method 500 can further include low pass filtering the second biased current before determining the biased current difference, resulting in a low pass filtered biased current. The method 500 can further include determining the biased current difference as a difference between the first biased current and the low pass filtered biased current. The total voltage can be determined as a sum of the average voltage, the 3-sigma value, the driver headroom value, the I*R losses, and the LED voltage adjustment.

Figure 6:
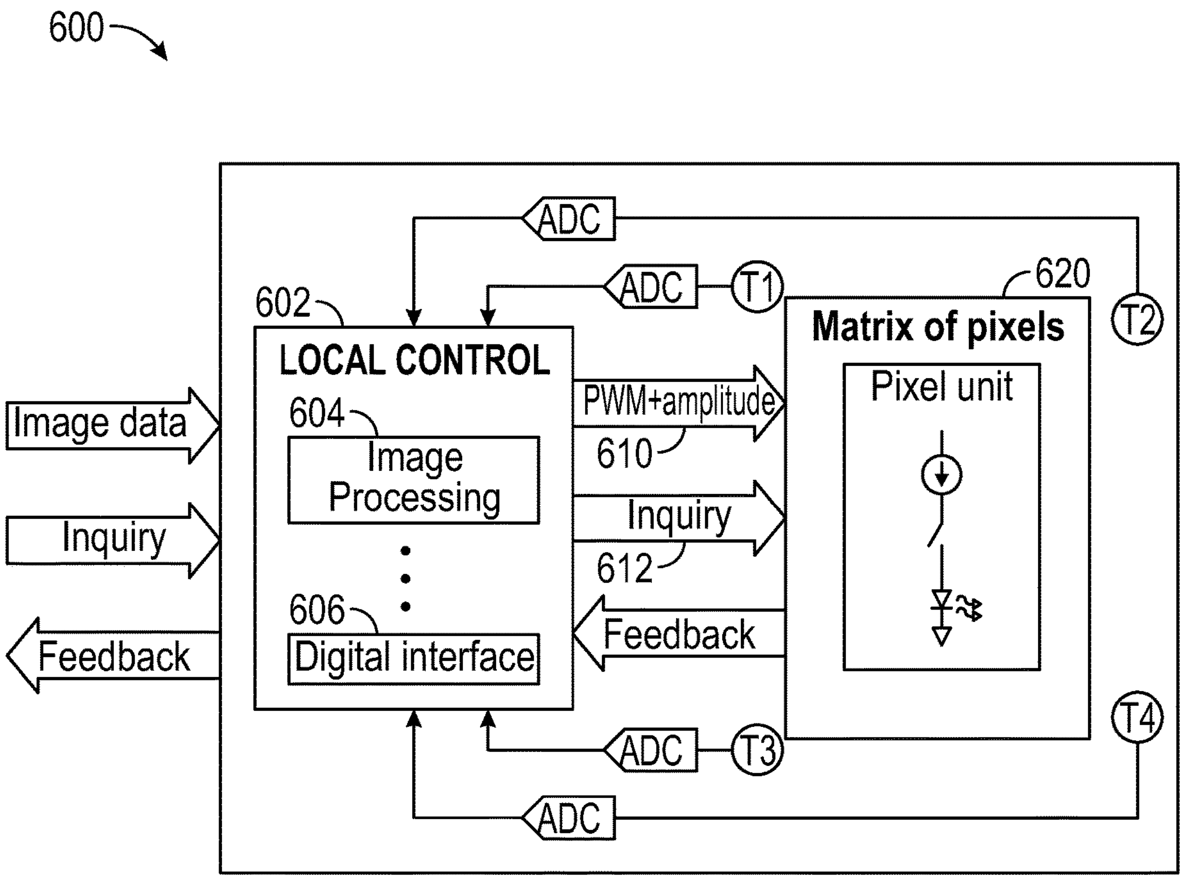
FIG. 6 illustrates an example of a system having a microLED control module.

FIG. 6 illustrates one example of a lighting matrix control system 600 having a suitable lighting logic and control module and/or pulse width modulation module to permit separately controlled and adjusted pixel intensity by setting appropriate ramp times and pulse width. Such adjusted pixel intensity, ramp times, or pulse width can help compensate for a temperature issue or a potential temperature issue. Addressable LED pixel activation can be used to provide patterned lighting, to reduce color or intensity variations, and to provide various pixel diagnostic functionality. A micro-LED array such as illustrated in FIG. 6 can contain arrays of thousands to millions of microscopic LED pixels that actively emit light and are individually controlled. To emit light in a pattern or sequence that results in display of an image, the current levels of the micro-LED pixels at different locations on an array can be adjusted individually according to a specific image. This can involve a pulse width modulation (PWM), which turns on and off the pixels at a certain frequency. During PWM operation, the average direct current (DC) through a pixel is the product of the current amplitude and the PWM duty cycle, which is the ratio between the conduction time and the period or cycle time.

Processing modules that facilitate efficient usage of the system 600 are illustrated in FIG. 6. The system 600 includes a control module 602 able to implement pixel or group pixel level control of amplitude and duty cycle for a micro-LED array. In some embodiments the system further includes an image processing module 604 to generate, process, or transmit an image, and digital control interfaces 606 such as inter-integrated circuit ($I^2C$) ($I^2C$ is a synchronous, multi-leader, multi-follower, packet switched, single-ended, serial communication bus) that are configured to transmit control data or instructions. The digital control interfaces 606 and control module 602 may include the system microcontroller and any type of wired or wireless module configured to receive a control input from an external device. By way of example, a wireless module may include blue tooth, Zigbee, Z-wave, mesh, WiFi, near field communication (NFC) and/or peer to peer modules may be used. The microcontroller may be any type of special purpose computer or processor that may be embedded in an LED lighting system and configured or configurable to receive inputs from the wired or wireless module or other modules in the LED system and provide control signals to other modules based thereon. Algorithms implemented by the microcontroller or other suitable control module 602 may be implemented in a computer program, software, or firmware incorporated in a non-transitory computer-readable storage medium for execution by the special purpose processor. Examples of non-transitory computer-readable storage mediums include a read only memory (ROM), a random-access memory (RAM), a register, cache memory, and semiconductor memory devices. The memory may be included as part of the microcontroller or may be implemented elsewhere, either on or off a printed circuit or electronics board The term module, block, circuitry, or the like, as used herein, may refer to electrical and/or electronic components disposed on individual circuit boards that may be soldered to one or more electronics boards. The term module may, however, also refer to electrical and/or electronic components that provide similar functionality, but which may be individually soldered to one or more circuit boards in a same region or in different regions. Electrical and/or electronic components can include one or more transistors, resistors, capacitors, diodes, amplifies, inductors, power supplies, memories, analog to digital converters (ADCs), digital to analog converters (DACs), switches, multiplexers, logic gates (e.g., AND, OR, XOR, negate, buffer, or the like), processor devices (e.g., central processing units (CPUs), graphics processing units (GPUs), field programmable gate arrays (FPGAs), application specific integrated circuits (ASICs), or the like), or the like.

As previously noted, control module 602 can further include the image processing module 604 and the digital control interfaces 606, such as can be implemented using $I^2C$. In some embodiments an image processing computation may be done by the control module 602 through directly generating a modulated image. Alternatively, a standard image file can be processed or otherwise converted to provide modulation to match the image. Image data that mainly contains PWM duty cycle values can be processed for all pixels in image processing module 604. Since amplitude is typically a fixed value or a value that is not change very often, amplitude related commands can be given separately through a different digital interface, (e.g., another $I^2C$, a controller area network (CAN), universal asynchronous transmitter/receiver (UART), serial peripheral interface (SPI), universal serial bus (USB), or the like). The control module 602 interprets the digital data, which is then used by a PWM generator of the control module 602 to generate PWM signals 610 for pixels, and by Digital-to-Analog Converter (DAC) signals 612 to generate the control signals for generating the required current source amplitude.

In some embodiments, discrete temperature sensors (T1-T4) can be used for temperature monitoring that can supplement or provide calibration for the described pixel level temperature monitoring system and method. In embodiments, the pixel matrix 620 in FIG. 6 can include m pixels that can support pixel level temperature measurements. In embodiments, the pixels are connected to current sources 334, 336 and a PWM switch 342, 344 such as previously described with respect to FIG. 3.

The control module 602 can be controlled by a higher-level controller, such as the temperature monitor and control system 122 (see FIG. 1) or command and control module 716 (see FIG. 7). The control module 602 can include or implement the functionality of the control block 352, controller 488, or vice versa.

FIG. 7 illustrates in more detail one chip level implementation of a system 700 supporting functionality such as discussed with respect to FIGS. 1-6. The system 700 includes a command-and-control module 716 able to provide temperature control monitoring and control as well as implement pixel or group pixel level control of amplitude and duty cycle for pixel circuitry. In some embodiments, the system 700 further includes a frame buffer 710 for holding generated or processed images that can be supplied to an active LED matrix 720. Other modules can include digital control interfaces such as $I^2C$ serial bus 712 or SPI interface 714 that are configured to transmit needed control data or instructions.

In operation, system 700 can accept image or other data from a vehicle or other source that arrives via the SPI interface 714. Successive images or video data can be stored in an image frame buffer 710. If no image data is available, one or more standby images held in a standby image buffer 711 can be directed to the image frame buffer 710. Such standby images can include, for example, an intensity and spatial pattern consistent with legally allowed low beam headlamp radiation patterns of a vehicle, or default light radiation patterns for architectural lighting or displays.

In operation, pixels in the images are used to define response of corresponding LED pixels in the active matrix, with intensity and spatial or temporal modulation of LED pixels being based on the image(s). To reduce data rate issues, groups of pixels (e.g., K×L blocks of pixels where K and L are integers greater than one) can be controlled as single blocks in some embodiments. In embodiments, high speed and high data rate operation is supported, with pixel values from successive images able to be loaded as successive frames in an image sequence at a rate between 30 Hz and 100 Hz, with 60 Hz being typical. PWM can be used to control each pixel to emit light in a pattern and with an intensity at least partially dependent on the image held in the image frame buffer 710.

In some embodiments, the system 700 can receive logic power via Vdd and Vss pins. An active matrix receives power for LED array control by multiple VLED and VCathode pins. The SPI interface 714 can provide full duplex mode communication using a master-slave architecture with a single master. The leader device originates the frame for reading and writing. Multiple follower devices are supported through selection with individual follower select (SS) lines. Input pins can include a Leader Output Follower Input (MOSI), a Leader Input Follower Output (MISO), a chip select (SC), and clock (CLK), all connected to the SPI interface 714. The SPI interface connects to an address generator, frame buffer, and a standby frame buffer. Pixels can have parameters set and signals or power modified (e.g., by power gating before input to the frame buffer, or after output from the frame buffer via pulse width modulation or power gating) by a command-and-control module. The SPI interface 714 can be connected to an address generation module 718 that in turn provides row and address information to the active matrix 720. The address generator module 718 in turn can provide the frame buffer address to the frame buffer 710.

In some embodiments, the command-and-control module 716 can be externally controlled via an $I^2C$ serial bus 712. A clock (SCL) pin and data (SDA) pin with 7-bit addressing can be supported. The command-and-control module 716 can include a digital to analog converter (DAC) and two analog to digital converters (ADC). These are respectively used to set $V_{bias}$ for a connected active matrix, help determine maximum $V_f$, and determine system temperature. Also connected are an oscillator (OSC) to set the pulse width modulation oscillation (PWMOSC) frequency for the active matrix 720. In embodiments, a bypass line is also present to allow address of individual pixels or pixel blocks in the active matrix for diagnostic, calibration, or testing purposes. The active matrix 720 can be further supported by row and column select that is used to address individual pixels, which are supplied with a data line, a bypass line, a PWMOSC line, a Vbias line, and a Vf line.

As will be understood, in some embodiments the described circuitry and active matrix 720 can be packaged and optionally include a submount or printed circuit board connected for powering and controlling light production by the semiconductor LED. In certain embodiments, the printed circuit board can also include electrical vias, heat sinks, ground planes, electrical traces, and flip chip or other mounting systems. The submount or printed circuit board may be formed of any suitable material, such as ceramic, silicon, aluminum, etc. If the submount material is conductive, an insulating layer is formed over the substrate material, and the metal electrode pattern is formed over the insulating layer. The submount can act as a mechanical support, providing an electrical interface between electrodes on the LED and a power supply, and also provide heat sinking.

More generally, light emitting active matrix pixel arrays such as discussed herein may support applications that benefit from fine-grained intensity, spatial, and temporal control of light distribution. This may include, but is not limited to, precise spatial patterning of emitted light from pixel blocks or individual pixels. Depending on the application, emitted light may be spectrally distinct, adaptive over time, and/or environmentally responsive. The light emitting pixel arrays may provide pre-programmed light distribution in various intensity, spatial, or temporal patterns. The emitted light may be based at least in part on received sensor data and may be used for optical wireless communications. Associated optics may be distinct at a pixel, pixel block, or device level. An example light emitting pixel array may include a device having a commonly controlled central block of high intensity pixels with an associated common optic, whereas edge pixels may have individual optics. Common applications supported by light emitting pixel arrays include video lighting, automotive headlights, architectural and area illumination, street lighting, and informational displays.

Light emitting matrix pixel arrays may be used to selectively and adaptively illuminate buildings or areas for improved visual display or to reduce lighting costs. In addition, light emitting pixel arrays may be used to project media facades for decorative motion or video effects. In conjunction with tracking sensors and/or cameras, selective illumination of areas around pedestrians may be possible. Spectrally distinct pixels may be used to adjust the color temperature of lighting, as well as support wavelength specific horticultural illumination.

Street lighting is an important application that may greatly benefit from use of light emitting pixel arrays. A single type of light emitting array may be used to mimic various street light types, allowing, for example, switching between a Type I linear streetlight and a Type IV semicircular streetlight by appropriate activation or deactivation of selected pixels. In addition, street lighting costs may be lowered by adjusting light beam intensity or distribution according to environmental conditions or time of use. For example, light intensity and area of distribution may be reduced when pedestrians are not present. If pixels of the light emitting pixel array are spectrally distinct, the color temperature of the light may be adjusted according to respective daylight, twilight, or night conditions.

Light emitting arrays are also well suited for supporting applications requiring direct or projected displays. For example, warning, emergency, or informational signs may all be displayed or projected using light emitting arrays. This allows, for example, color changing or flashing exit signs to be projected. If a light emitting array is composed of a large number of pixels, textual or numerical information may be presented. Directional arrows or similar indicators may also be provided.

Vehicle headlamps are a light emitting array application that requires large pixel numbers and a high data refresh rate. Automotive headlights that actively illuminate only selected sections of a roadway can used to reduce problems associated with glare or dazzling of oncoming drivers. Using infrared cameras as sensors, light emitting pixel arrays activate only those pixels needed to illuminate the roadway, while deactivating pixels that may dazzle pedestrians or drivers of oncoming vehicles. In addition, off-road pedestrians, animals, or signs may be selectively illuminated to improve driver environmental awareness. If pixels of the light emitting pixel array are spectrally distinct, the color temperature of the light may be adjusted according to respective daylight, twilight, or night conditions. Some pixels may be used for optical wireless vehicle to vehicle communication.

Additional Notes and Examples

Example 1 includes a control system comprising a plurality of pixels, each pixel of the pixel including a pixel driver and a corresponding light emitting diode (LED), a memory including voltage data stored thereon, the voltage data including one or more of a 3-sigma value, a driver headroom value, a resistance value, or a k-factor value, a controller coupled to the memory and the pixels, the controller configured to sample an anode voltage of each LED of the pixels resulting in sampled voltages, determine an average voltage based on the sample voltages, and determine a total voltage to provide to the pixels based on the average voltage and the voltage data.

In Example 2, Example 1 further includes, wherein the voltage data further includes data indicating respective duty cycles for each of the pixels for a current display frame and an immediately previous display frame.

In Example 3, Example 2 further includes, wherein the controller is configured to estimate a first total current for the current display frame as a sum of the duty cycles for the pixels for the current display frame, and the total voltage is determined based on the first total current.

In Example 4, Example 3 further includes, wherein the voltage data includes a global bias current, and the controller is configured to multiply the first total current by the global bias current resulting in a first biased current, multiply the first biased current by the resistance value resulting in I*R losses, and determine the total voltage further based on the I*R losses.

In Example 5, Example 4 further includes, wherein the controller is configured to estimate a second total current for the immediately previous display frame as a sum of the duty cycles for the pixels for the immediately previous display frame and determine the total voltage based on the second total current.

In Example 6, Example 5 further includes, wherein the controller is configured to multiply the second total current by the global bias current resulting in a second biased current, determine a biased current difference between the first biased current and the second biased current, and determine the total voltage based on the biased current difference.

In Example 7, Example 6 further includes, wherein the controller is configured to multiply the second biased current by the k-factor value resulting in an LED voltage adjustment, and determine the total voltage based on the LED voltage adjustment.

In Example 8, Example 7 further includes, wherein the controller is configured to low pass filter the second biased current before determining the biased current difference, resulting in a low pass filtered biased current, and determine the biased current difference as a difference between the first biased current and the low pass filtered biased current.

In Example 9, Example 8 further includes, wherein the total voltage is determined as a sum of the average voltage, the 3-sigma value, the driver headroom value, the I*R losses, and the LED voltage adjustment.

Example 10 includes a method of performing operations of the controller of one of Examples 1-9.

Example 11 includes a non-transitory machine-readable medium including instructions that, when executed by a controller, cause the controller to perform the operations of the controller of one of Examples 1-9.

Many modifications and other embodiments of the invention will come to the mind of one skilled in the art having the benefit of the teachings presented in the foregoing descriptions and the associated drawings. Therefore, it is understood that the invention is not to be limited to the specific embodiments disclosed, and that modifications and embodiments are intended to be included within the scope of the appended claims. It is also understood that other embodiments of this invention may be practiced in the absence of an element/step not specifically disclosed herein. In those embodiments supporting software-controlled hardware, the methods, procedures, and implementations described herein may be realized in a computer program, software, or firmware incorporated in a computer-readable medium for execution by a computer or processor. Examples of computer-readable media include electronic signals (transmitted over wired or wireless connections) and computer-readable storage media. Examples of computer-readable storage media include, but are not limited to, a read only memory (ROM), a random-access memory (RANI), a register, cache memory, semiconductor memory devices, magnetic media such as internal hard disks and removable disks, magneto-optical media, and optical media such as CD-ROM disks, and digital versatile disks (DVDs).

The invention claimed is:

1. A control system comprising:

a plurality of pixels, each pixel of the pixel including a pixel driver and a corresponding light emitting diode (LED);

a memory including voltage data stored thereon, the voltage data including one or more of a 3-sigma value that is three times a standard deviation of forward voltages of the pixels, a driver headroom value that indicates how much higher than a forward voltage a driver voltage needs to be for the driver to operate the LED, a resistance value that is an estimate of an equivalent resistance used to determine I*R losses from the control system, or a k-factor value that indicates how much to increase VLED if there is a change in content to be provided by the LED;

a controller coupled to the memory and the pixels, the controller configured to:

sample an anode voltage of each LED of the pixels resulting in sampled voltages;

determine an average voltage based on the sample voltages; and determine a total voltage to provide to the pixels based on the average voltage and the voltage data.

2. The control system of claim 1, wherein the voltage data further includes data indicating respective duty cycles for each of the pixels for a current display frame and an immediately previous display frame.

3. The control system of claim 2, wherein:

the controller is configured to estimate a first total current for the current display frame as a sum of the duty cycles for the pixels for the current display frame; and the total voltage is determined based on the first total current.

4. The control system of claim 3, wherein:

the voltage data includes a global bias current; and the controller is configured to multiply the first total current by the global bias current resulting in a first biased current, multiply the first biased current by the resistance value resulting in I*R losses, and determine the total voltage further based on the I*R losses.

5. The control system of claim 4, wherein the controller is configured to estimate a second total current for the immediately previous display frame as a sum of the duty cycles for the pixels for the immediately previous display frame and determine the total voltage based on the second total current.

6. The control system of claim 5, wherein the controller is configured to multiply the second total current by the global bias current resulting in a second biased current, determine a biased current difference between the first biased current and the second biased current, and determine the total voltage based on the biased current difference.

7. The control system of claim 6, wherein the controller is configured to multiply the second biased current by the k-factor value resulting in an LED voltage adjustment, and determine the total voltage based on the LED voltage adjustment.

8. The control system of claim 7, wherein the controller is configured to low pass filter the second biased current before determining the biased current difference, resulting in a low pass filtered biased current, and determine the biased current difference as a difference between the first biased current and the low pass filtered biased current.

9. The control system of claim 8, wherein the total voltage is determined as a sum of the average voltage, the 3-sigma value, the driver headroom value, the I*R losses, and the LED voltage adjustment.

10. A method performed by a light emitting diode (LED) matrix controller, the method comprising:

sampling an anode voltage of each LED of a plurality of pixels resulting in sampled voltages;

determining an average voltage based on the sample voltages; and determining a total voltage to provide to the pixels based on the average voltage and voltage data from a memory coupled to the controller, the voltage data including one or more of a 3-sigma value that is three times a standard deviation of forward voltages of the pixels, a driver headroom value that indicates how much higher than a forward voltage a driver voltage needs to be for the driver to operate the LED, a resistance value that is an estimate of an equivalent resistance used to determine I*R losses from a control system, or a k-factor value that indicates how much to increase VLED if there is a change in content to be provided by the LED.

11. The method of claim 10, wherein the voltage data further includes data indicating respective duty cycles for each of the pixels for a current display frame and an immediately previous display frame.

12. The method of claim 11, further comprising estimating a first total current for the current display frame as a sum of the duty cycles for the pixels for the current display frame; and determining the total voltage based on the first total current.

13. The method of claim 12, wherein the voltage data includes a global bias current and the method further comprises multiplying the first total current by the global bias current resulting in a first biased current, multiply the first biased current by the resistance value resulting in I*R losses, and determine the total voltage further based on the I*R losses.

14. The method of claim 13, further comprising estimating a second total current for the immediately previous display frame as a sum of the duty cycles for the pixels for the immediately previous display frame and determining the total voltage based on the second total current.

15. The method of claim 14, further comprising multiplying the second total current by the global bias current resulting in a second biased current, determining a biased current difference between the first biased current and the second biased current, and determining the total voltage based on the biased current difference.

16. The method of claim 15, further comprising multiplying the second biased current by the k-factor value resulting in an LED voltage adjustment, and determining the total voltage based on the LED voltage adjustment.

17. The method of claim 16, further comprising low pass filtering the second biased current before determining the biased current difference, resulting in a low pass filtered biased current, and determining the biased current difference as a difference between the first biased current and the low pass filtered biased current.

18. The method of claim 17, wherein the total voltage is determined as a sum of the average voltage, the 3-sigma value, the driver headroom value, the I*R losses, and the LED voltage adjustment.

19. A non-transitory machine-readable medium including instructions that, when executed by a controller of a light emitting diode (LED) array, cause the controller to perform operations comprising:

sampling an anode voltage of each LED of a plurality of pixels resulting in sampled voltages;

determining an average voltage based on the sample voltages; and determining a total voltage to provide to the pixels based on the average voltage and voltage data from a memory coupled to the controller, the voltage data including one or more of a 3-sigma value that is three times a standard deviation of forward voltages of the pixels, a driver headroom value that indicates how much higher than a forward voltage a driver voltage needs to be for the driver to operate the LED, a resistance value that is an estimate of an equivalent resistance used to determine I*R losses from a control system, or a k-factor value that indicates how much to increase VLED if there is a change in content to be provided by the LED.

20. The non-transitory machine-readable medium of claim 19, wherein the voltage data further includes data indicating respective duty cycles for each of the pixels for a current display frame and an immediately previous display frame.

* * * * *